US 7,103,040 B2

(12) United States Patent
Aalbers et al.

(10) Patent No.: US 7,103,040 B2
(45) Date of Patent: Sep. 5, 2006

(54) METHOD AND APPARATUS FOR IDENTIFYING A NODE FOR DATA COMMUNICATIONS USING ITS GEOGRAPHICAL LOCATION

(75) Inventors: Roeland G. D. Aalbers, Enschede (NL); Andreas W. J. Louwes, Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1009 days.

(21) Appl. No.: 09/988,224

(22) Filed: Nov. 19, 2001

(65) Prior Publication Data

US 2003/0095520 A1     May 22, 2003

(51) Int. Cl.
*H04L 12/50* (2006.01)
(52) U.S. Cl. ...................................... 370/388; 370/401
(58) Field of Classification Search ................ 370/254, 370/255, 351, 389, 400
See application file for complete search history.

(56) References Cited

U.S. PATENT DOCUMENTS 5,809,440 A      9/1998  Beck et al.
6,636,490 B1 *  10/2003  Johnson ...................... 370/328
6,678,732 B1 *   1/2004  Mouko et al. .............. 709/227
6,829,230 B1 * 12/2004  Tiuri ........................... 370/351

FOREIGN PATENT DOCUMENTS

| WO | WO 99/43174 A | 8/1999 |
| WO | WO 00/27091 A | 5/2000 |
| WO |    01/22656 A2 | 3/2001 |
| WO | WO 01/22656   | 3/2001 |
| WO | WO 01/22656 A | 3/2001 |
| WO | WO 01/82032 A | 11/2001 |
| WO | WO 02/07467 A | 1/2002 |

* cited by examiner

*Primary Examiner*—Chau Nguyen
*Assistant Examiner*—Tito Pham
(74) *Attorney, Agent, or Firm*—Nixon & Vanderhye P.C.

(57) ABSTRACT

The present invention overcomes drawbacks with on-site, manual configuration of IP addresses for network nodes (like newly-installed base stations) with a method to automatically assign an identifier like a packet data address to a new node. In general., the automatic assignment of such an identifier to a network entity, node, or host includes two steps. First, an initial message is transmitted by the entity which specifies or indicates in some way geographical location information for the entity. Second, using the geographical location information in that message, an identifier is assigned and provided to that entity. In other words, a relationship is established between the geographical location of an entity identifier and its associated identifier. The geographical location information uniquely identifies the entity in the automatic identifier assignment process.

8 Claims, 4 Drawing Sheets

METHOD AND APPARATUS FOR IDENTIFYING A NODE FOR DATA COMMUNICATIONS USING ITS GEOGRAPHICAL LOCATION

FIELD OF THE INVENTION

The present invention relates to packet communications, and more particularly, to identifying a node in a network using its geographical location. One example, non-limiting application of the present invention is providing IP addresses to nodes in a cellular communications system using their respective geographical locations.

BACKGROUND AND SUMMARY OF THE INVENTION

In any data communications network, new nodes may need to be installed 10 and configured as the network expands. Nodes may also need to be reconfigured if the network is upgraded. Furthermore, when an existing node is brought off-line, e.g., for an upgrade, and then re-installed, that node may also need to be reconfigured. One part of that configuration process to which the present invention relates is configuring a node for packet data communication with other nodes. Specifically, each node needs a packet data address to conduct packet communications. For purposes of the following description, a "new" node or a node requiring configuration is a node that requires assignment of a packet data address.

It is desirable to minimize the effort, time, and expense associated with assigning packet data addresses or other data identifiers, e.g., domain names, to the new node. One example where installation and configuration of a new node can be a time consuming job is when a new radio base station is added to a cellular communications system. Because base stations, by their very nature, are distributed in geographically remote areas, considerable time is required for a human operator to travel to the new base station and manually configure it with a new IP address, which makes this an inefficient process. It is also susceptible to human error, e.g., data entry errors.

The present invention overcomes these and other drawbacks with on-site, manual configuration of IP addresses for network nodes (like newly-installed base stations) with a method to automatically assign a node identifier like a packet data address to a new node. In general, the automatic assignment of a node identifier like a packet address to a network entity, node, or host includes two steps. First, an initial message is transmitted by the entity, which specifies or indicates in some way geographical location information for the entity. Second, using the geographical location information in that message, a corresponding node identifier (like a packet address) is identified and provided to that entity. In other words, a relationship is established between the geographical location of the entity and its associated host identifier. In the example where the entity identifier is a packet data address, the geographical location information uniquely identifies the entity and its packet data address.

Although the present invention may be applied to any new entity or node using any messaging protocol, one non-limiting example application is to new nodes in a cellular communications system. As applied to a new base station, the present invention automatically provides, for example, a packet data address to the new base station after it is installed in a radio network using the base station's geographical location. One example way of determining its geographical location is to use a Global Positioning Satellite (GPS) receiver at the base station to determine its geographical coordinates, e.g., its latitude and longitude. The base station sends its coordinates in an announcement message to a packet address server. One example of a packet address server is a Dynamic Host Configuration Protocol (DHCP) server coupled to the network. In this context, the announcement message can be a DHCPDISCOVER message that includes the base station's geographical coordinates.

An operation and/or planning node coupled to the cellular network may provide the packet address server with the relationship between a unique set of geographical coordinates and a base station for multiple base stations in the form of an electronic list. In addition to that relationship, the operations/planning node may also specify in the list a particular Internet Protocol (IP) address for each of multiple base stations along with their respective geographical coordinates. The DHCP server compares the geographical coordinates received in the DHCPDISCOVER message with the base station "list" information received from the operation and/or planning node and returns the predetermined IP address that is associated with the geographical coordinates in a responsive message, e.g., a DHCPOFFER message.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, the present invention may be applied to any machine, host, or entity (including a software or hardware entity) that can be configured for data packet communications.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors DSPs).

Figure 1:
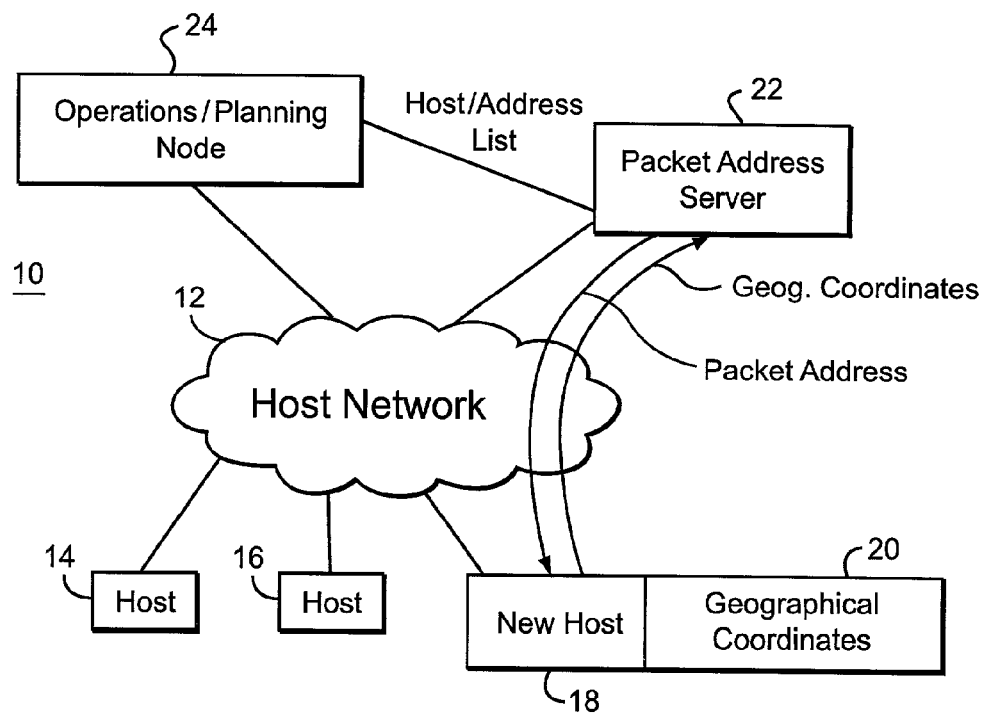
FIG. 1 illustrates a general communications system in which the present application is implemented.

Reference is now made to the communications system 10 shown in FIG. 1. A host network 12 is coupled to a plurality of already-configured hosts 14 and 16. New host 18, also coupled to the host network 12, has not been configured with a packet data address, and therefore, packet communications with the new host are not yet possible. The hosts may be coupled to the host network either through a wireline or a wireless link.

Also coupled to the host network is a packet address server 22 and an operations or planning node 24, both of which are involved in configuring new hosts. In order to automate the process of assigning a packet data address to a new host, (which is part of the new host configuration process), the operations/planning node 24 provides the packet address server 22 with a list of host identifiers along with corresponding geographical location information for each host. A host identifier is a general term used to describe any name, ID, or address that, once assigned to the new host, permits data communications with the new host. A non-limiting example of geographical location information is geographical coordinates like latitude and longitude. The packet address server 22 stores the host/geographical location information list.

When the new host 18 is coupled to the host network 12 and ready to 10 transmit and receive packet information, it transmits or broadcasts an initialization, discovery, announcement, or other similar message that includes the host's geographical location information 20. Of course, other information may be included with this message if desired. The new host 18 either has already stored its geographical location information in memory, or more advantageously, it can determine its geographical location information As after it has been coupled to the host network. One method for determining its geographical coordinates includes using well-known Global Positioning Satellite (GPS) positioning techniques.

The initialization, discovery, announcement, or other similar message from the new host is received by the packet address server 22 via the host network 12. The packet address server 22 checks the geographical location information received from the new host with the stored list and returns, in this example, a corresponding packet address to the new host 18. With the corresponding packet address, packet communications may now be conducted with the new host 18.

Figure 2:
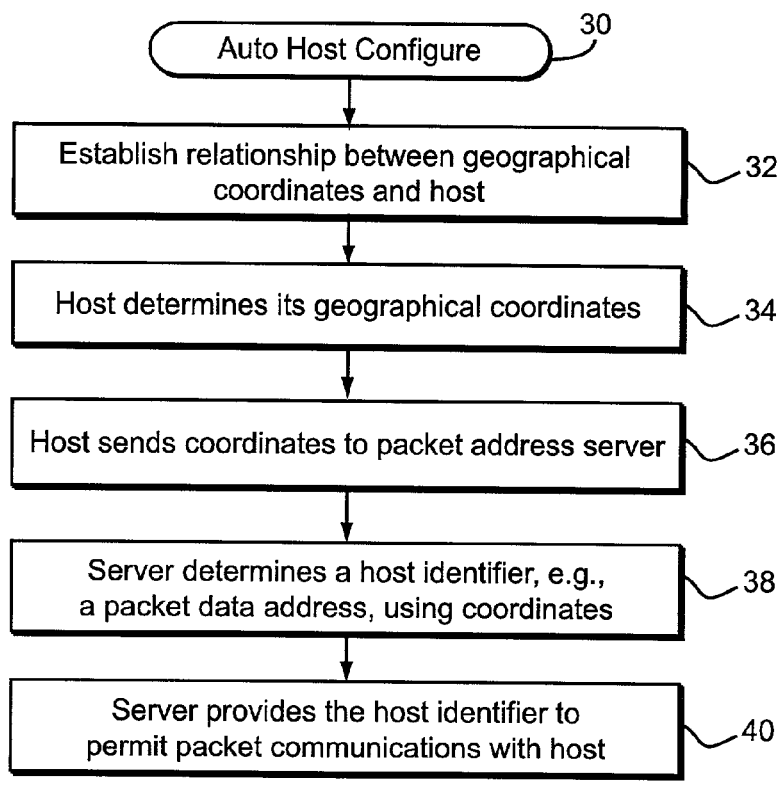
FIG. 2 illustrates example procedures for automatically assigning a packet data address to a new host node coupled to the host network shown in FIG. 1.

FIG. 2 shows in flowchart form example procedures for implementing an Automatic Host Configure routine (block 30) in accordance with the present invention. Initially, a relationship is established between a host identifier (in this example a packet data address) and its geographical location information (block 32). In one example implementation, as shown in FIG. 1, this relationship may be established by an operations or planning node 24, and thereafter, provided to a packet access server 22. However, those skilled in the art will appreciate that this relationship may be established by other entities. After being coupled to the host network, and in preparation for configuration, the host determines its geographical location information (block 34). As mentioned above, this location information may be already stored in the host or the host may determine its location information using, for example, GPS location determining equipment.

When the host is ready to obtain its host identifier, e.g., packet data address, it broadcasts or sends directly to a packet address server a message that includes its geographical location information (block 36). The server assigns a host identifier, e.g., a packet address, for the host using that geographical location information (block 38). The packet address server provides the corresponding host identifier to the host, thereby permitting packet communications with the host (block 40).

Thus, the present invention permits a new host to be automatically configured with a packet data address, name, or other identifier using the new host's geographical location to uniquely identify the new host to the packet address server. By performing this configuration operation automatically, the time and costs associated with manual configuration are greatly reduced. Moreover, human errors associated with data entry, incorrect operation of equipment, etc. are eliminated.

Figure 3:
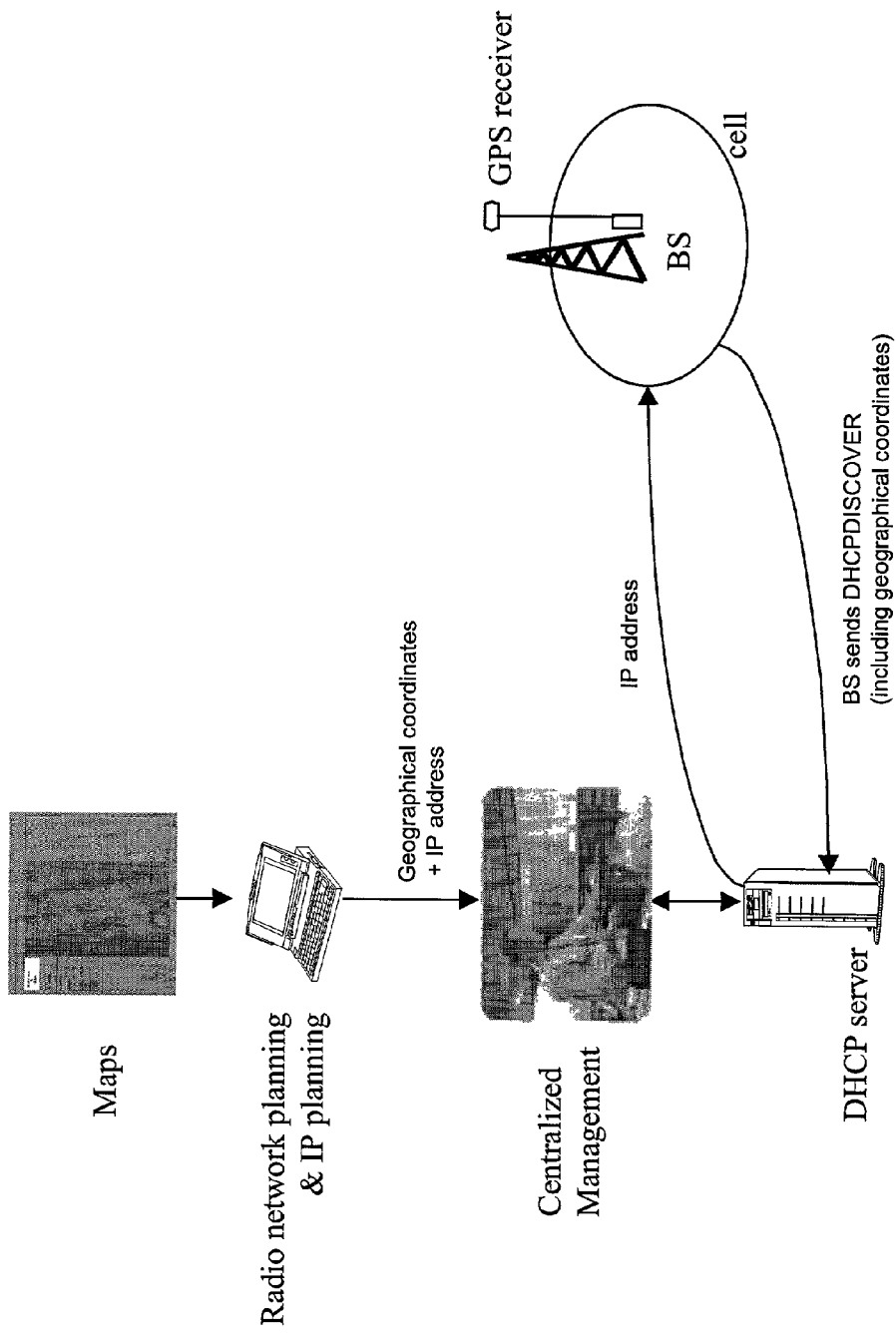
FIG. 3 illustrates example procedures in a specific application of the present invention to a cellular communications system where the new host node is a newly installed base station.

Although the present invention may be applied to any host or entity associated with a network that must be configured with a packet data address, name, or other identifier, one example application of such a host/entity is a new node added to a cellular communications network. FIG. 3 illustrates an example where the present invention is employed to automatically configure a newly-installed base station with an IP address. Prior to installation, a map with geographical location information for each base station (current and future), including the newly-installed base station, is provided to a radio network and IP planning node shown as a laptop computer. The radio network and IP planning node may be operated at a centralized management facility.

Using the base station coordinates obtained from the map showing various base stations (current and future) positioned geographically in a cellular coverage area, each base station is correlated to and uniquely identified by its geographical coordinates. The radio network and IP planning node also associates the base station with a corresponding IP address. Once the radio network and IP planning is completed, the base station location (and perhaps other) information is forwarded to a Dynamic Host Configuration Protocol (DHCP) server which stores for each base station its corresponding geographical coordinates and IP address. DHCP is a known Internet protocol where a server allocates an IP address to a client.

The base station includes a GPS receiver which receives GPS signals used to is determine the base station's geographical coordinates. When attached to the cellular network, the base station broadcasts a DHCPDISCOVER message which includes its geographical coordinates. The DHCP server in the cellular network detects the broadcast and the geographical coordinates, compares the coordinates to the list from the radio network planning node, and returns a DHCPOFFER message with the corresponding IP address from the list, as well as other information if desired. The base station, upon receiving the DHCPOFFER message with the IP address, returns a DHCPREQUEST message which is acknowledged by the DHCP server in a DHCPACK message informing the base station that the IP address assignment has been completed.

Figure 4:
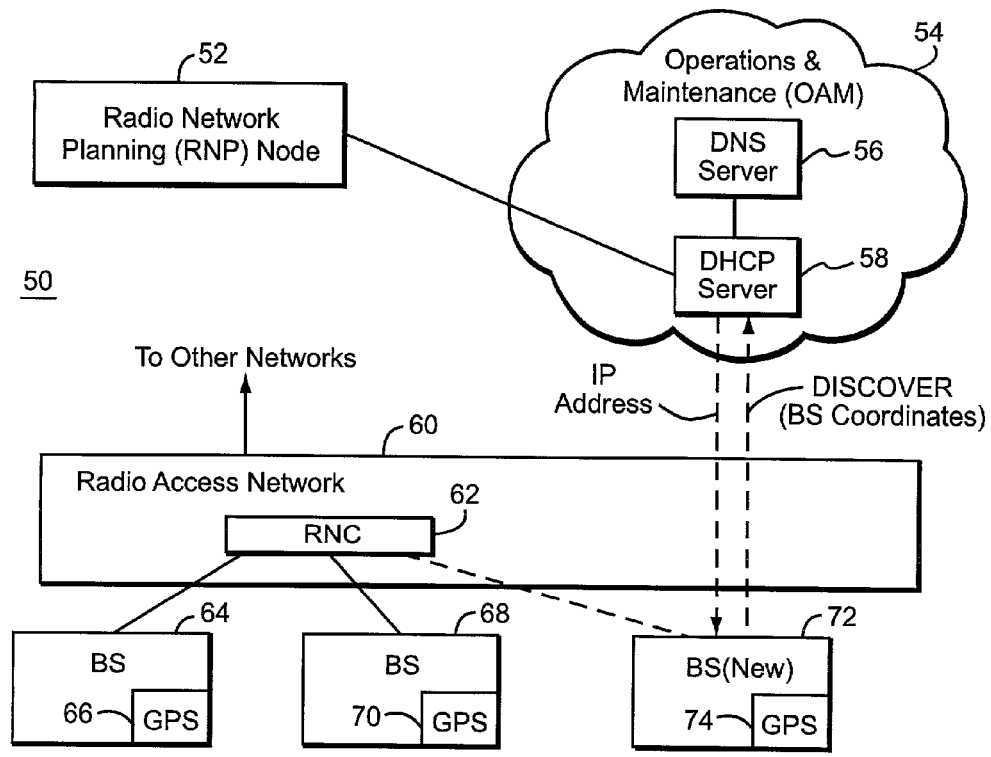
FIG. 4 is a function block diagram illustrating in more detail entities in the cellular communications system in FIG. 3.
Figure 5:
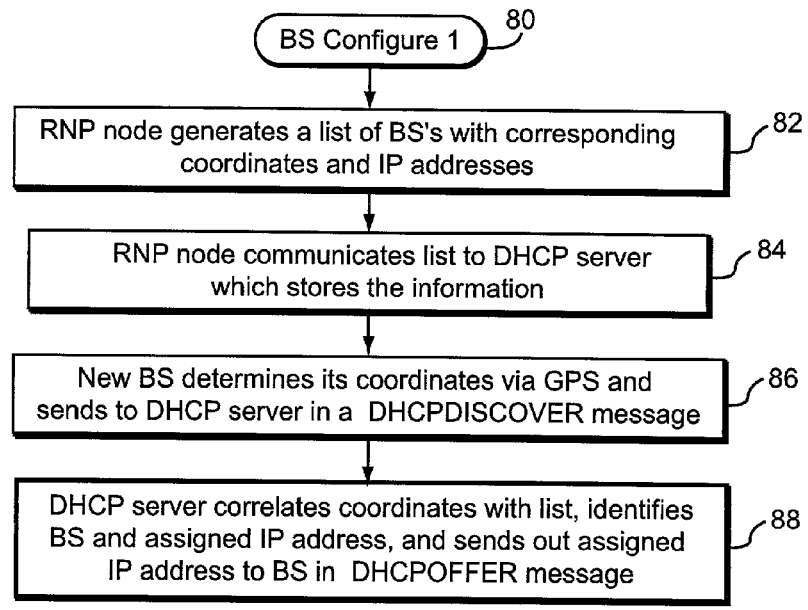
FIG. 5 illustrates in flowchart form example procedures for automatically assigning a packet data address to a new base station in accordance with one example embodiment of the present invention.

Reference is now made to the cellular communications system 50 shown in FIG. 4. A radio network planning (RNP) node 52 is coupled to a DHCP server 58 in an operations and maintenance (OAM) network 54. The DHCP server 58 is also coupled to a domain naming system (DNS) server 56 (optional). The radio network planning node 52 provides information to the DHCP server 58. A radio access network 60 is coupled to the operations and maintenance network 54 and to other networks not shown. The radio access network 60 includes one or more radio network controllers (RNC) 62. Each RNC 62 is coupled to a plurality of base stations which, in this example, includes two already-configured base stations 64 and 68 as well as a new base station 72 to be configured.

The radio network planning node 52 may store in a list for each base station coupled to (or to be coupled to) the radio access network 60 some kind of base station identifier, like an IP address or a domain name that can be resolved into an IP address, along with its geographical coordinates. This list is provided to the DHCP server 58 and stored there. Each base station 64, 68, and 72 may include its own GPS receiver 66, 70, and 74, respectively. The GPS receiver may be used to determine the geographical location of the base station, e.g., its latitude and longitude. Although the base station may have pre-stored its location coordinates before installation, an advantage of the GPS receiver is that specific base stations need not be assigned ahead of time to specific locations. This adds flexibility and eliminates the administration required to ensure each base station is installed in its preassigned location.

As described above, when the new base station 72 attaches to the radio 20 access network 60, it sends a DHCPDISCOVER message with its coordinates, e.g., as determined by the GPS receiver 74, to the DHCP server 58. The DHCP server 58 checks its stored list with the received coordinates and returns an IP address corresponding to the base station 72 in a DHCPOFFER message. With its IP address, the base station 72 is ready to communicate data packets with other entities in the cellular network.

Reference is made to the Base Station Configure 1 routine (block 80) which illustrates in flowchart form example procedures in accordance with a first example embodiment. The radio network planning (RNP) node 52 generates a list of base stations with corresponding geographical coordinates and IP addresses (block 82). The RNP node 52 communicates the list to the DHCP server 58 which stores the information (block 84). A new base station 72 attaching to the radio access network 60 determines its geographical coordinates via GPS receiver 74 and sends to the DHCP server 58 a DHCPDISCOVER message with its geographical coordinates (block 86). The DHCP server 58 correlates those geographical coordinates with the stored list, identifies the base station that corresponds to those coordinates, and assigns the IP address from the list that corresponds to those geographical coordinates to that base station. The server then sends out a DHCPOFFER message with the assigned IP address to the base station (block 88).

Figure 6:
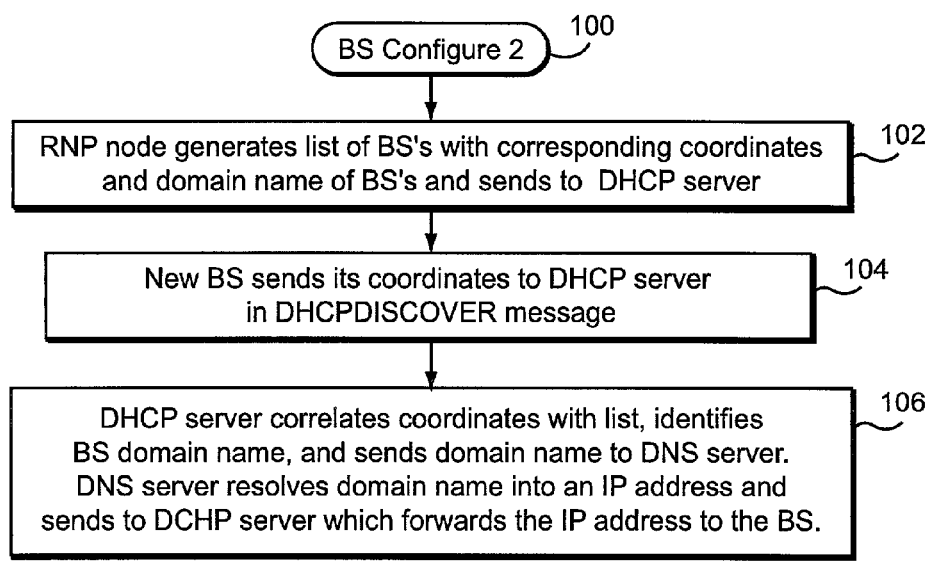
FIG. 6 illustrates in flowchart form example procedures for automatically assigning a packet data address to a new base station in accordance with a second example embodiment of the present invention.

A variation for configuring the new base station 72 in accordance with the present invention is illustrated in a Base Station Configure 2 routine (block 100) outlined in flowchart form in FIG. 6. The radio network planning node 52 generates a list of base stations with corresponding coordinates and domain names for various base stations and sends that list to the DHCP server 58 (block 102). The new base station 72 sends its geographical coordinates to the DHCP server 58 when it attaches to the radio access network 60 in a DHCPDISCOVER message (block 104). The DHCP server 58 correlates the received geographical coordinates with those in the stored list and identifies the base station domain name. It sends that domain name to a DNS server 56 which resolves the domain name into an IP address for the base station. The DNS server 56 sends the IP address to the DHCP server 58 which forwards the IP address to the new base station 72.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Again, the present invention may be applied to any node or entity coupled to a network configured to communicate data packets. Moreover, the invention links any type of host identifier to the geographical location of the host. Accordingly, it is intended that the invention be limited only by the scope of the claims appended hereto.

What is claimed is:

1. A method for automatically configuring a new radio base station in a cellular communications network, comprising:

a radio network planning node generating a list of base stations with corresponding geographical location information and Internet Protocol (IP) addresses;

the radio network planning node communicating the list to a dynamic host configuration protocol (DHCP) server located in an operations and maintenance network;

the DHCP server storing the list;

the base station determining its geographical location;

the base station sending geographical location information to the DHCP server in a DHCP DISCOVER message;

the DHCP server receiving the DHCP DISCOVER message and using the geographical location information to determine from the stored list an IP address in the list for the base station; and the DHCP server sending a DHCP OFFER message to the base station with determined IP address.

2. The method in claim 1, wherein the base station's geographical location information is determined using a GPS receiver.

3. A method for automatically configuring a new radio base station in a cellular communications network, comprising:

a radio network planning node generating a list of base stations with corresponding geographical location information and domain names of base stations;

the radio network planning node communicating the list to a dynamic host configuration protocol (DHCP) server located in an operations and maintenance network;

the DHCP server storing the list;

the base station determining its geographical location;

the base station sending geographical location information to the DHCP server in a DHCP DISCOVER message;

the DHCP server receiving the DHCP DISCOVER message and using the geographical location information to determine from the stored list a domain name in the list for the base station;

the DHCP server sending the base station domain name to a domain name server;

the domain name server resolving the base station domain name into an IP address and sending the IP address to the DHCP server; and the DHCP server receiving the IP addresses and sending a DHCP OFFER message to the base station with the IP address.

4. The method in claim 3, wherein the base station's geographical location information is determined using a GPS receiver.

5. Apparatus for automatically configuring a new radio base station in a cellular communications network, comprising:
- a radio network planning node for generating a list of base stations with corresponding geographical location information and Internet Protocol (IP) addresses;
- a dynamic host configuration protocol (DHCP) server located in an operations and maintenance network, where the radio network planning node is configured to communicate the list to the DHCP server and the DHCP server is configured to store the list; and
- a base station configured to determine its geographical location and to send geographical location information to the DHCP server in a DHCP DISCOVER message,
- wherein the DHCP server is configured to receive the DHCP DISCOVER message and use the geographical location information to determine from the stored list an IP address in the list for the base station, and
- wherein the DHCP server is configured to send a DHCP OFFER message to the base station with determined IP address.

6. The method in claim 5, wherein the base station is configured to determine the geographical location information using a GPS receiver.

7. Apparatus for automatically configuring a new radio base station in a cellular communications network, comprising:
- a radio network planning node for generating a list of base stations with corresponding geographical location information and domain names of base stations;
- a dynamic host configuration protocol (DHCP) server located in an operations and maintenance network, where the radio network planning node is configured to communicate the list to the DHCP server and the DHCP server is configured to store the list; and
- a base station configured to determine its geographical location and to send geographical location information to the DHCP server in a DHCP DISCOVER message,
- wherein the DHCP server is configured to receive the DHCP DISCOVER message and use the geographical location information to determine from the stored list a domain name in the list for the base station,
- wherein the DHCP server is configured to send the base station domain name to a domain name server,
- wherein the domain name server is configured to resolve the base station domain name into an IP address and send the IP address to the DHCP server, and
- wherein the DHCP server is configured to receive the IP address and send a DHCP OFFER message to the base station with the IP address.

8. The method in claim 7, wherein the base station is configured to determine the geographical location information using a GPS receiver.

* * * * *